United States Patent
Li et al.

(10) Patent No.: US 10,964,309 B2
(45) Date of Patent: Mar. 30, 2021

(54) CODE-SWITCHING SPEECH RECOGNITION WITH END-TO-END CONNECTIONIST TEMPORAL CLASSIFICATION MODEL

(71) Applicant: Microsoft Technology Licensing, LLC, Redmond, WA (US)

(72) Inventors: Jinyu Li, Redmond, WA (US); Guoli Ye, Redmond, WA (US); Rui Zhao, Bellevue, WA (US); Yifan Gong, Sammamish, WA (US); Ke Li, Baltimore, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/410,556

(22) Filed: May 13, 2019

(65) Prior Publication Data
US 2020/0335082 A1    Oct. 22, 2020

Related U.S. Application Data

(60) Provisional application No. 62/834,609, filed on Apr. 16, 2019.

(51) Int. Cl.
*G10L 15/00* (2013.01)
*G10L 15/06* (2013.01)
*G10L 15/04* (2013.01)

(52) U.S. Cl.
CPC ............ *G10L 15/005* (2013.01); *G10L 15/04* (2013.01); *G10L 15/063* (2013.01); *G10L 2015/0635* (2013.01)

(58) Field of Classification Search
CPC ........ G06F 40/00; G06F 40/12; G06F 40/126; G06F 40/129; G06F 40/20; G06F 40/205;
(Continued)

(56) References Cited

U.S. PATENT DOCUMENTS 10,573,312 B1 *  2/2020  Thomson ................ G10L 15/26
2017/0316775 A1 * 11/2017  Le ........................... G10L 15/16
(Continued)

OTHER PUBLICATIONS

"International Search Report and Written Opinion Issued in PCT Application No. PCT/US2020/021931", dated May 14, 2020, 13 Pages.
(Continued)

*Primary Examiner* — Andrew C Flanders
(74) *Attorney, Agent, or Firm* — Buckley, Maschoff & Talwalkar LLC

(57) ABSTRACT

A CS CTC model may be initialed from a major language CTC model by keeping network hidden weights and replacing output tokens with a union of major and secondary language output tokens. The initialized model may be trained by updating parameters with training data from both languages, and a LID model may also be trained with the data. During a decoding process for each of a series of audio frames, if silence dominates a current frame then a silence output token may be emitted. If silence does not dominate the frame, then a major language output token posterior vector from the CS CTC model may be multiplied with the LID major language probability to create a probability vector from the major language. A similar step is performed for the secondary language, and the system may emit an output token associated with the highest probability across all tokens from both languages.

20 Claims, 9 Drawing Sheets

(58) Field of Classification Search
CPC .... G06F 40/211; G06F 40/242; G06F 40/247; G06F 40/263; G06F 40/268; G06F 40/279; G06F 40/284; G06F 40/289; G06F 40/40; G06F 40/42; G06F 40/44; G06F 40/53; G10L 15/005; G10L 15/04; G10L 15/05; G10L 15/06; G10L 15/063; G10L 15/08; G10L 15/083; G10L 15/16; G10L 15/18; G10L 15/1815; G10L 15/1822; G10L 15/183; G10L 15/187; G10L 15/19; G10L 15/193; G10L 15/22; G10L 17/04; G10L 17/22; G10L 17/26; G10L 2015/0635; G10L 2015/223; G10L 2015/783; G10L 2015/932; G10L 2015/938; G10L 25/78; G10L 25/81; G10L 25/84; G10L 25/87; G10L 25/93; G10L 17/18; G10L 2015/0631; G10L 2015/0633; G10L 2015/06335; G10L 2015/0636; G10L 2015/0638; G10L 25/30; G06N 20/00; G06N 20/10; G06N 20/20; G06N 3/02; G06N 3/049; G06N 3/06; G06N 3/063; G06N 7/046

See application file for complete search history.

(56) References Cited

U.S. PATENT DOCUMENTS

| | | | | |
|---|---|---|---|---|
| 2019/0189111 | A1* | 6/2019 | Watanabe | G10L 15/16 |
| 2019/0318725 | A1* | 10/2019 | Le Roux | G10L 15/063 |
| 2020/0160836 | A1* | 5/2020 | Chen | G10L 15/063 |
| 2020/0175961 | A1* | 6/2020 | Thomson | G10L 15/063 |
| 2020/0193977 | A1* | 6/2020 | Ramabhadran | G10L 15/22 |
| 2020/0226327 | A1* | 7/2020 | Matusov | G10L 25/90 |

OTHER PUBLICATIONS

Yeh, et al., "Recognition of Highly Imbalanced Code-Mixed Bilingual Speech with Frame-Level Language Detection Based on Blurred Posteriorgram", In Proceedings of the IEEE International Conference on Acoustics, Speech and Signal Processing, Mar. 25, 2012, pp. 4873-4876, 4 pp.

Ardila, Alfredo, "Spanglish: An Anglicized Spanish Dialect", In Hispanic Journal of Behavioral Sciences, vol. 27, Issue 1, Feb. 1, 2005, 23 Pages.

Audhkhasi, "Building Competitive Direct Acoustics-to-Word Models for English Conversational Speech Recognition", In the Proceedings of International Conference on Acoustics, Speech and Signal Processing, Apr. 15, 2018, 5 Pages.

Bahdanau, et al., "End-to-End Attention-Based Large Vocabulary Speech Recognition", In the Repository of arXiv:1508.04395, Mar. 14, 2016, 8 Pages.

Bahdanau, et al., "Neural machine translation by jointly learning to align and translate", Published as a conference paper at ICLR, 2015, 15 Pages.

Battenberg, et al., "Exploring Neural Transducers for end-to-end Speech Recognition", In the Proceedings of Automatic Speech Recognition and Understanding Workshop, Dec. 16, 2017, 8 Pages.

Cao, et al., "Semantics-based Language Modeling for Cantonese-English Code-Mixing Speech Recognition", In 7th International Symposium on Chinese Spoken Language Processing, Nov. 29, 2010, pp. 246-250.

Chan, et al., "Detection of Language Boundary in Code-Switching Utterances by Bi-Phone Probabilities", In the Proceedings of International Symposium on Chinese Spoken Language Processing, Dec. 15, 2004, pp. 293-296.

Chan, et al., "Listen, attend and spell", In the Proceedings of Computing Research Repository, Aug. 2015, pp. 1-16.

Chiu, et al., "State-of-the-art speech recognition with sequence-to-sequence models", In the Proceedings of International Conference on Acoustics, Speech and Signal Processing, Apr. 15, 2018, 5 Pages.

Cho, et al., "Learning phrase representations using rnn encoder-decoder for statistical machine translation.", In Proceedings of the Conference on Empirical Methods in Natural Language Processing, Oct. 25, 2014, pp. 1724-1734.

Chorowski, et al., "Attention-based models for speech recognition", In Journal of Advances in Neural Information Processing Systems, Jun. 24, 2015, pp. 1-19.

Das, et al., "Advancing Acoustic-to-Word CTC Model with Attention and Mixed-Units", In the Repository of arXiv:1812.11928, Dec. 31, 2018, 12 Pages.

Das, et al., "Advancing Connectionist Temporal Classification with Attention Modeling", In the Proceedings of International Conference on Acoustics, Speech and Signal Processing, Apr. 15, 2018, 5 Pages.

Dey, et al., "A Hindi-English Code-Switching Corpus", In the Proceedings of the Ninth International Conference on Language Resources and Evaluation, May, 2014, pp. 2410-2413.

Emond, et al., "Transliteration Based Approaches to Improve code-switched Speech Recognition Performance", In the Proceedings of Spoken Language Technology Workshop, Dec. 18, 2018, 8 pages.

Graves, et al., "Connectionist temporal classification: labelling unsegmented sequence data with recurrent neural networks", In Proceedings of the 23rd international conference on Machine learning, Jun. 25, 2006, 8 Pages.

Graves, Alex, "Sequence transduction with recurrent neural networks", In Journal of Computing Research Repository, Nov. 14, 2012, 9 Pages.

Graves, et al., "Towards End-to-End Speech Recognition with Recurrent Neural Networks", In Proceedings of the 31st International Conference on Machine Learning, Jun. 21, 2014, 9 Pages.

Guo, et al., "Study of Semi-Supervised Approaches to Improving English-Mandarin Code-Switching Speech Recognition", Published in Interspeech, 2018, Jun. 16, 2018, 5 Pages.

Huang, et al., "Cross-Language Knowledge Transfer Using Multilingual Deep Neural Network With Shared Hidden Layers", In Proceedings of IEEE International Conference on Acoustics, Speech and Signal Processing, May 26, 2013, 5 Pages.

Kim, et al., "Towards Language-Universal End-to-end Speech Recognition", In the Proceedings of International Conference on Acoustics, Speech and Signal Processing, Apr. 15, 2018, 5 Pages.

Li, et al., "Acoustic-To-Word Model Without Oov", In Proceedings of IEEE Automatic Speech Recognition and Understanding Workshop, Dec. 16, 2017, 6 Pages.

Li, et al., "Advancing Acoustic-to-Word CTC Model", In the Proceedings of International Conference on Acoustics, Speech and Signal Processing, Apr. 15, 2018, 5 Pages.

Li, David C.S., "Cantonese-English Code-Switching Research in Hong Kong: A Y2K Review", In the Journal of World Englishes, vol. 19, Issue 3, Nov. 2000, pp. 305-322.

Li, et al., "Spoken Language Recognition: From Fundamentals to Practice", In Proceedings of the IEEE, vol. 101, Issue 5, Feb. 6, 2013, pp. 1136-1159.

Li, et al., "Towards Code-switching ASR for End-to-end CTC Models", In the Proceedings of International Conference on Acoustics, Speech and Signal Processing, May 12, 2019, pp. 6076-6080.

Lyu, et al., "An Analysis of a Mandarin-English Code-Switching Speech Corpus: Seame", In the Journal of Age, vol. 21, 2010, 4 Pages.

Lyu, et al., "Speech Recognition on Codeswitching among the Chinese Dialects", In the Proceedings of International Conference on Acoustics Speech and Signal Processing Proceedings, May 14, 2006, pp. 1105-1108.

Lyudovyk, et al., "Code-Switching Speech Recognition for Closely Related Languages", Published in Spoken Language Technologies for Under-Resourced Languages, May 14, 2016, pp. 188-193.

Mabokela, et al., "Modeling Code-Switching Speech on Under-Resourced Languages for Language Identification", In the Third Workshop on Spoken Language Technologies for Under-resourced Languages, 2012, May 14, 2014, pp. 225-230.

(56) References Cited

OTHER PUBLICATIONS

Miao, et al., "Eesen: End-to-end speech recognition using deep RNN models and WFST-based decoding", In the Proceedings of IEEE Workshop on Automatic Speech Recognition and Understanding, Dec. 13, 2015, 8 Pages.

Nakayama, et al., "Speech Chain for Semi-Supervised Learning of Japanese-English Code-Switching ASR and TTS", In the Proceedings of Spoken Language Technology Workshop, Dec. 18, 2018, 8 Pages.

Prabhavalkar, et al., "A Comparison of Sequence-to-Sequence Models for Speech Recognition", In the book Interspeech, Aug. 20, 2017, pp. 939-943.

Rao, et al., "Exploring Architectures, Data and Units for Streaming end-to-end Speech Recognition with RNN Transducer", In the Proceedings of Automatic Speech Recognition and Understanding Workshop, Dec. 16, 2017, 7 Pages.

Sainath, et al., "Improving the Performance of Online Neural Transducer Models", In the Proceedings of International Conference on Acoustics, Speech and Signal Processing, Apr. 15, 2018.

Sak, et al., "Fast and Accurate Recurrent Neural Network Acoustic Models for Speech Recognition", In Proceedings of 16th Annual Conference of the International Speech Communication Association, Sep. 6, 2015, 5 Pages.

Sak, et al., "Recurrent Neural Aligner: An Encoder-Decoder Neural Network Model for Sequence to Sequence Mapping", In the Book of Interspeech, Aug. 20, 2017, pp. 1298-1302.

Seki, et al., "An end-to-end language-Tracking Speech Recognizer for Mixed-language Speech", In the Proceedings of International Conference on Acoustics, Speech and Signal Processing, Apr. 15, 2018, 6 Pages.

Senior, et al., "Acoustic Modelling with CD-CTCSMBR LSTM RNNs", In the Proceedings of Workshop on Automatic Speech Recognition and Understanding, Dec. 13, 2015, pp. 604-609.

Soltau, et al., "Neural Speech Recognizer: Acoustic-toword LSTM Model for large Vocabulary Speech Recognition", In the Repository of arXiv:1610.09975, Oct. 31, 2016, 6 Pages.

Sreeram, et al., "A Novel Approach for Effective Recognition of the Code-Switched Data on Monolingual Language Model", Published in Interspeech, Sep. 2, 2018, pp. 1953-1957.

Toshniwal, et al., "Multilingual Speech Recognition with a Single end-to-end Model", In the Proceedings of International Conference on Acoustics, Speech and Signal Processing, Apr. 15, 2018, 6 Pages.

Weiner, et al., "Integration of Language Identification into a Recognition System for Spoken Conversations Containing Code-Switches", In Third Workshop on Spoken Language Technologies for Under-resourced Languages, May 2012, 4 Pages.

Yang, et al., "Joint Modeling of Scents and Scoustics for Multi-Accent Speech Recognition", In the Proceedings of International Conference on Acoustics, Speech and Signal Processing, Apr. 15, 2018, 5 Pages.

Yilmaz, et al., "Acoustic and Textual Data Augmentation for Improved ASR of Code-Switching Speech", Published in Interspeech, 2018, Jul. 28, 2018, 5 Pages.

Yilmaz, et al., "Investigating bilingual deepNeural Networks for Automatic Speech Recognition of Code-Switching Frisian Speech", In the Journal of Procedia Computer Science, vol. 81, May 9, 2016, pp. 159-166.

Zeng, et al., "Improving N-gram Language Modeling for code-switching Speech Recognition", In Proceedings of Asia-Pacific Signal and Information Processing Association Annual Summit and Conference, Dec. 12, 2017, pp. 1596-1601.

Zissman, Marc A., "Comparison of four Approaches to Automatic Language Identification of Telephone Speech", In the Journal Transactions on Speech and Audio Processing, vol. 4, Issue 1, Jan. 1996, pp. 31-44.

* cited by examiner

CODE-SWITCHING SPEECH RECOGNITION WITH END-TO-END CONNECTIONIST TEMPORAL CLASSIFICATION MODEL

CROSS-REFERENCE TO RELATED APPLICATIONS

The present application claims the benefit of U.S. Provisional Patent Application No. 62/834,609 entitled "CODE-SWITCHING SPEECH RECOGNITION WITH END-TO-END CTC MODELS" and filed Apr. 16, 2019. The entire content of that application is incorporated herein by reference.

BACKGROUND

Automatic Speech Recognition ("ASR") generates word hypotheses from a speech waveform spoken by a user. In End-to-End ("E2E") ASR, such as one associated with Connectionist Temporal Classification ("CTC"), the system outputs a word-level decoding hypothesis (e.g., that the user said "hello, assistant"). In some cases, a user may combine words from multiple languages when speaking (e.g., when a Chinese speaker references an "iPhone"). Such situations are referred to as Code-Switching ("CS") ASR. It can be difficult, however, for a single algorithm to identify words from more than one language.

What is needed is a system to accurately and efficiently improve CS ARS using E2E CTC models.

SUMMARY

This summary is provided to introduce a selection of concepts in a simplified form that are further described below in the detailed description section. This summary is not intended to identify all key or essential features of the claimed subject matter, nor is it intended as an aid in determining the scope of the claimed subject matter.

Systems, methods, and computer readable storage devices embodying instructions for providing an attention model trained as an end-to-end system for ASR are provided herein. A CS CTC model may be initialed from a major language CTC model by keeping network hidden weights and replacing output tokens with a union of major and secondary language output tokens. The initialized CS CTC model may be trained by updating parameters with training data from both languages, and a Language Identification ("LID") model may also be trained with the training data. During a decoding process for each of a series of frames associated with a speech waveform input, if silence dominates a current frame a silence then an output token may be emitted. If silence does not dominate the current frame, a major language output token posterior vector (e.g., constructed from posteriors of all the tokens of the major language) from the CS CTC model may be multiplied with the LID major language probability to create a probability vector from the major language. A similar step may be performed for the secondary language, and the system may emit an output token associated with the highest probability across all tokens from both languages.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

DETAILED DESCRIPTION

The following description is provided to enable any person in the art to make and use the described embodiments. Various modifications, however, will remain readily apparent to those in the art.

Figure 1:
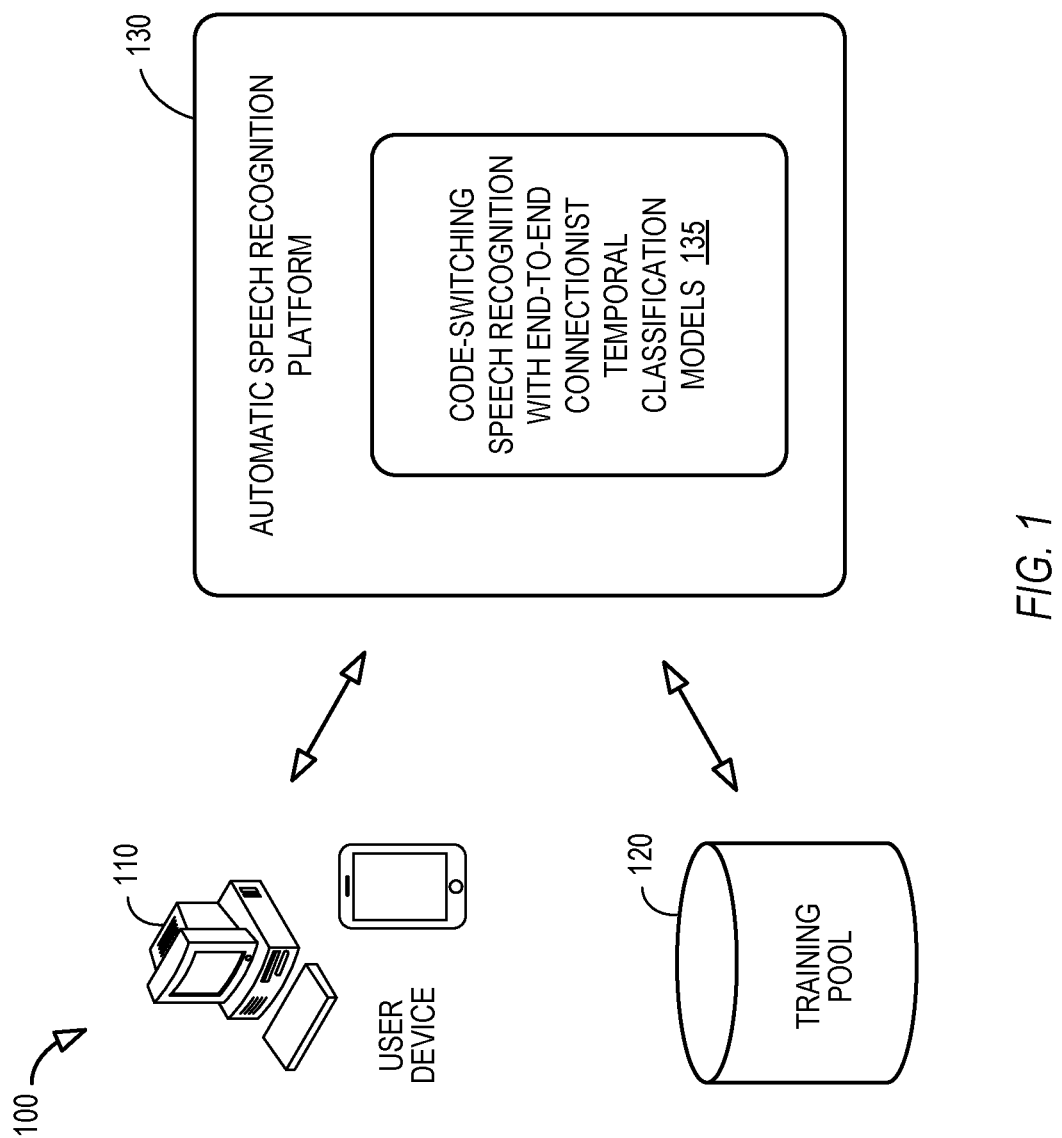
FIG. 1 is a high-level block diagram illustrating an example operating environment according to some embodiments.

FIG. 1 illustrates an example operating environment 100 in which some embodiments of the present disclosure may be practiced. As illustrated, a user device 110 may provide utterances from a user to a database maintaining a training pool 120 and/or to an ASR platform 130. The ASR platform 130 may receive utterances from the user device 110 and/or training utterances from the training pool 120 to provide a training dataset against which to train an E2E CTC model 135 to perform CS ASR.

The user device 110, training pool 120, and ASR platform 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in connection with FIGS. 4 through 6.

While the user device 110, training pool 120, and ASR platform 130 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

Although great progress has been made on E2E models for monolingual and multilingual ASR, the intra-sentential CS ASR task is challenging. Some embodiments described herein provide an approach for CS ASR using E2E CTC models. In some embodiments, a frame-level language identification model may be used to linearly adjust the posteriors of an E2E CTC model.

Traditionally, ASR systems contain components including acoustic, pronunciation, and language models that are separately trained, each with a different objective. An E2E ASR system directly maps an input sequence of acoustic features to an output sequence of characters, phonemes, or words. Examples of E2E ASR systems include CTC, attention-based encoder-decoder networks, Recurrent Neural Network ("RNN") transducers, etc. These E2E models have been successfully applied to large-scale monolingual, as well as multilingual, ASR tasks. However, it is very challenging to be successful in CS ASR. CS refers to the phenomenon of mixed words or phrases from two or more distinct languages by a speaker. This phenomenon widely exists in multilingual communities such as Cantonese-English, Chinese-English, Spanish-English, Hindi-English, Frisian-Dutch, etc. Depending on when the language switching happens, two types of CS phenomenon may occur. One is intra-sentential CS when the switch happens within a single utterance. The other is inter-sentential CS when the switch occur at a boundary of an utterance. The former phenomenon is more a difficult task because mixed language acoustical variations within an utterance can be more substantial as compared to across utterances.

Some embodiments described herein provide an effective way of doing intra-sentential CS ASR for E2E CTC models. Note that E2E CTC models may produce comparable performance as compared to traditional hybrid deep acoustic models if the training data size is reasonably large. Embodiments may improve the performance of E2E CTC systems for CS scenarios and, at the same time, maintain reasonable performance recognizing the major language. In some embodiments, a Language Identification ("LID") based approach to deal with CS ASR for E2E CTC models. The E2E CTC model and LID model may be separately trained, and posteriors of the CTC model may be directly adjusted with corresponding LID scores. Some embodiments use greedy decoding without a language model or lexicon component.

Some embodiments described herein use bidirectional Long Short-Term Memory ("LSTM") Recurrent Neural Networks ("RNNs") as model architecture and CTC loss as objective function. Note that ASR output symbols in an utterance are usually fewer than the input speech frames (with each frame representing, for example, 10 milliseconds of speech waveform input). As a result, CTC paths that allow repeated labels and blank tokens may be used to force the output to have the same length as the input speech frames. Denoting x as the speech input sequence, l as the original label sequence, π as the CTC path, Θ as the network parameters, and $B^{-1}(l)$ as all possible CTC paths expanded from l, the CDC loss function may be defined as the sum of negative log probabilities of correct labels as shown equation 1:

$$L_{CTC} = -\ln P_\Theta(l \mid x) = -\ln \sum_{\pi \in B^{-1}(l)} P_\Theta(\pi \mid x)$$

Based on the conditional independence assumption for output units, $P_\Theta(\pi|x)$ can be decomposed to a product of posteriors from each time step t as shown in equation 2:

$$P_\Theta(\pi \mid x) \prod_{t=1}^{T} P_\Theta(\pi_t \mid x_t)$$

where $x_t$ is the input speech at time t, $\pi_t$ is the output unit at time t, and T is the sequence length in frames.

Figure 2:
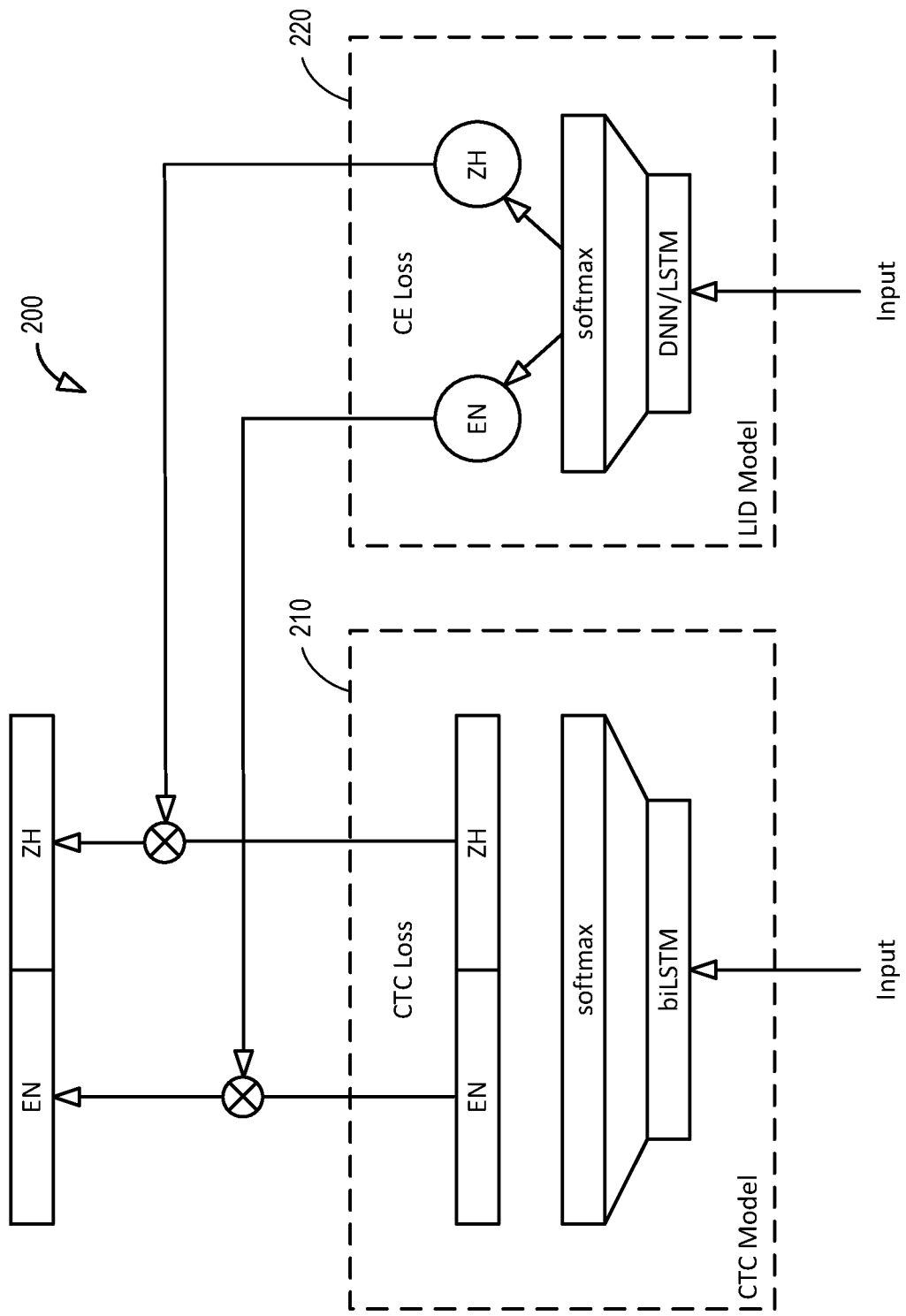
FIG. 2 is an explicitly combined CTC model and a frame-level LID model for recognizing CS utterances in accordance with some embodiments.

FIG. 2 illustrates a system 200 with an explicitly combined CTC model 210 and a frame-level LID model 220 to recognize CS utterances. Chinese ("ZH") and English ("EN") are the languages in this example. The LID model 220 may improve the E2E CTC's performance on CS utterances. As CS ASR is a challenging task of recognizing large amount of output units from both the major and secondary languages, it is relatively easier to recognize which language the segments come from. If the system 200 can accurately predict the language at each time step, especially for the switching cases, it may use this information to better guide the original ASR model to handle CS scenarios. Hence, the CS ASR performance may be improved by switching from a challenging CS ASR problem to an easier LID task.

Note that various methods can be applied to the LID model 220 and that LID models usually work on an utterance or phrase level. According to some embodiments, a frame-level LID model 220 may be utilized for CS ASR so that the system can combine LID outputs with CTC outputs at the frame level. Some embodiments use feed-forward Deep Neural Networks ("DNNs") and LSTMs to build a frame-level LID model 220 to predict both the major (or "first") language and secondary (or "second") language as well as silence.

Figure 3:
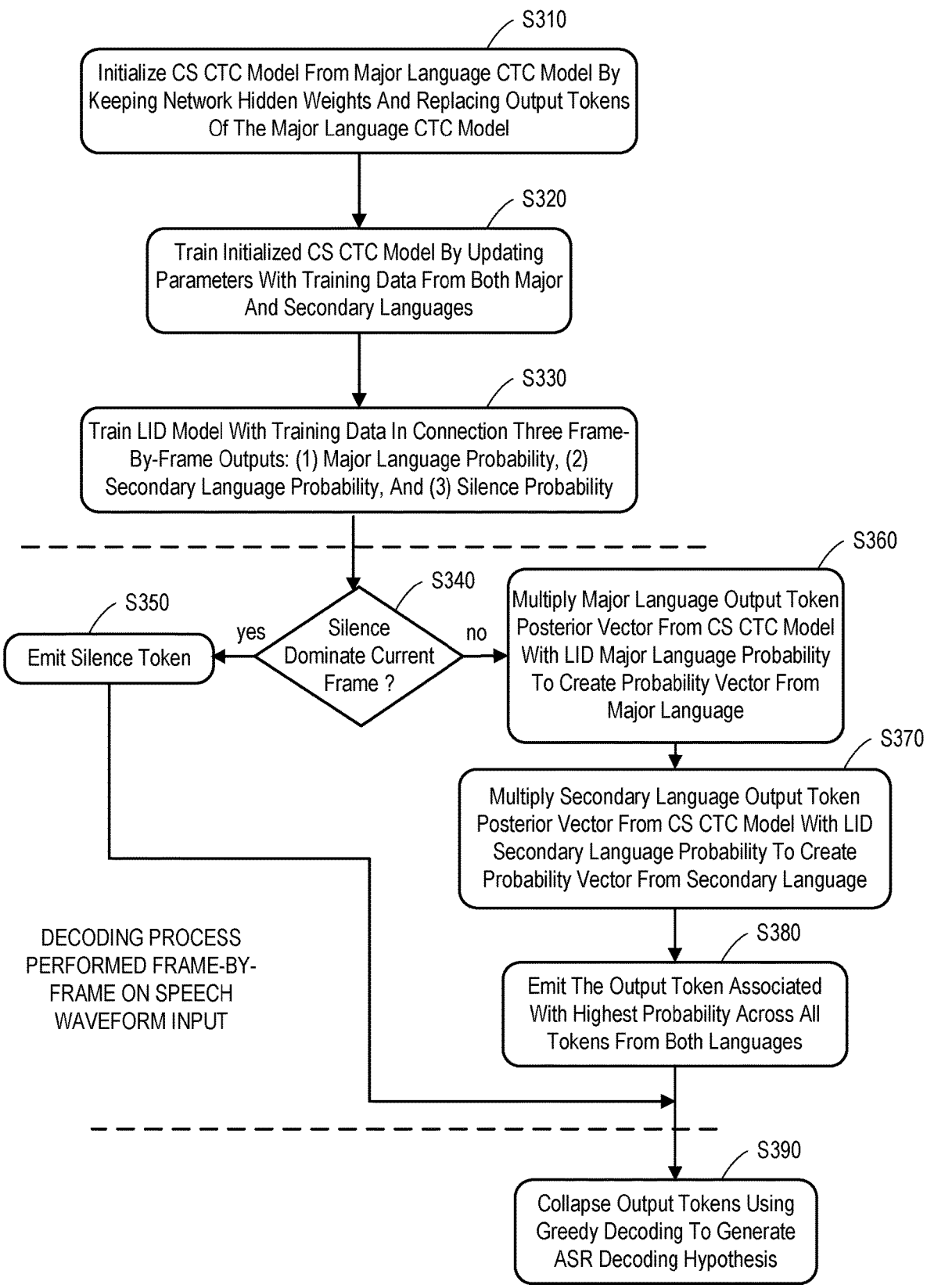
FIG. 3 is an ASR method according to some embodiments.

Thus, some embodiments provide an explicit combination of a frame-level LID model 220 and an E2E CTC model 210. FIG. 1 provides an example how to train a CS model 200 with the help of a LID model 220 for Chinese-English CS utterances. The detailed process is provided in FIG. 3 which is a flow diagram of a process to CS ASR in accordance with some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, the system may initialize the CS CTC model from a major language CTC model by keeping the network hidden weights and replacing the output targets of the major language with a union of units from the major and secondary languages (along with silence). Based on the experience that CTC models are very sensitive to initialization, initializing them from the CTC model of the major language at S310 may help ensure that the CS model will still work reasonably on the major language. Note that this is different from the common multilingual setup which usually trains the shared hidden layer by treating all languages equally.

At S320, the system may train the CS CTC model by updating all of the parameters with data from both languages. At S330, the system may train a LID model using the same training data with three outputs (predicting the major language, the secondary language, and silence frame-by-frame). Note that both DNN and LSTM models can be used to predict frame-level LID at S330. However, it may not be practical to accurately predict the language of a frame using only a single frame. Therefore, for DNN-based LID predictions the system may use a relatively large context window so that sufficient information is provided to predict current frame's language. For LSTM-based LID prediction, a bi-directional model should be able to predict language well because the bi-directional processing has the access to the whole utterance.

During decoding, if the blank symbol dominates current frame at S340, the system emits the blank token as the label of this frame at S350. Otherwise, the system multiplies the posterior vectors of the major and secondary language outputs from the CTC model with the LID probabilities of the corresponding languages at S360 and S370. The system may then emit the label with the maximum probability across all tokens from both languages at S380.

Consider a more formal expression of the proposed combination at S360 through S380, where the expression denotes $o_t$ as the predicted language at time t, the probability of each language given a speech frame $x_t$ at time t is $P(o_t|x_t)$. The adjusted posterior of CTC $P_\Theta^{adj}(\pi_t|x_t)$ at time step t can be written as equation 3:

$$P_\Theta^{adj}(\pi_t | x_t) = P_\Theta(\pi_t | x_t) \times P(o_t | x_t)^\alpha$$

where α is the hyper-parameter that controls the influence of the LID on the CTC posteriors.

It should be noted that the combination of CTC and LID posteriors might only make sense when the CTC model is a bi-directional model. This is because a uni-directional CTC model has an output delay issue which means the position of the CTC output is not well aligned. In contrast, the bi-directional CTC may give reliable output alignment because it has information from both directions.

Steps S340 through S380 comprise a decoding process that is performed repeatedly on a frame-by-frame bases until an entire speech waveform input has been processed. The decoding hypothesis may then be generated at S380 by collapsing the emitted output tokens with greedy decoding (e.g., as described in connection with FIG. 7). Note that the output labels of E2E CTC systems can be either letters or words. Moreover, CTC outputs are usually dominated by blank labels and the outputs corresponding to the non-blank labels usually occur with spikes in their posteriors. Thus, an easy way to generate ASR outputs using CTC is to concatenate the non-blank labels corresponding to the posterior spikes and collapse those labels into word outputs if needed. This is referred to herein as "greedy decoding." It may be an attractive feature for E2E modeling because is neither a Language Model ("LM") nor any complex decoding is required.

Some embodiments were evaluated on the live utterances collected from Chinese speakers, focusing on CS scenarios of Chinese ("ZH") and English ("EN"). Note, however, that embodiments may also be applied to other languages and situations with more than two languages. In the following examples, the major language is Chinese and the secondary language is English. A goal was to improve Chinese-English CS performance without sacrificing too much ASR accuracy for Chinese utterances.

The testing used two test sets: (1) a CS test set, containing 30,000 Chinese characters and English words (accounts for 33.8%), and (2) a Chinese-only test set with 50,000 Chinese characters. Every Chinese character was treated as a word, and thus a Word Error Rate ("WER") could be measured for the evaluation. For training, both monolingual and CS data were used (with around 4,000 hours of Chinese data, 3,400 hours of US-English data, and 300 hours code-switch data).

The MICROSOFT® Cognitive Toolkit ("CNTK") was used to train the CTC models described herein. All of the E2E CTC models contain six bi-directional LSTM layers (with 512 hidden dimensions in each direction). 80-dimensional log Mel filter-bank energies were derived at 10 millisecond ("ms") intervals and three contiguous frames were stacked to form 240-dimensional features for CTC. Greedy decoding was applied to generate word sequences based on posterior spikes of the CTC models.

Table 1 illustrates WERs (%) of baseline CTC models trained from Chinese (ZH) data or the combination with English (EN) or CS data (CS).

TABLE 1

| Test Sets | ZH | ZH + EN | ZH + EN + CS | CS |
|---|---|---|---|---|
| CS set | 58.06 | 59.08 | 30.81 | 25.48 |
| ZH set | 11.03 | 11.04 | 11.01 | 21.92 |

A baseline CTC model was first trained with monolingual 4,000 hours of Chinese data. This used around 7,000 Chinese characters together with blanks as the outputs. This model obtains 11.03% WER on the Chinese only set and 58.06% WER on the CS test set, as shown in Table 1. All of the CS CTC models were initialized from this baseline Chinese CTC model as described with respect to S310 of FIG. 3.

In the following, several CS CTC models are built that have both Chinese and English output units. Given that there are around 7,000 Chinese characters, around 8,000 letter trigrams were selected as the English outputs. In this way, the system can balance the Chinese and English outputs. The Chinese characters and English letter trigrams were merged to form 15,000 output units used for the CS models.

The first CS CTC model was built by merging the 4,000 hours Chinese-only and 3,400 hours English-only data to investigate whether a CS model can be built from monolingual data. Unfortunately, this model did not improve the accuracy for the CS test set, but it also did not degrade the performance on the Chinese test set. This might be because the model was initialized from the Chinese CTC model (which makes the final model still biased towards Chinese outputs).

A second CS CTC model was built by merging all the monolingual data with 300 hours CS data so that this model can observe the CS phenomenon. This model significantly improves the performance on the CS test set with 30.81% WER (and still has similar performance on the Chinese test set with 11.01% WER).

Finally, a third CS CTC model was built with only 300 hours of CS data. This configuration performs the best on the CS test set (with 25.48% WER) but the worst on the Chinese test set (with 21.92% WER).

Given the goal of improving CS performance while still keeping comparable performance on the Chinese test set, improvements to the first and second CS models (but not the third CS model) will now be described.

Both DNN and LSTM based LIDs were trained. The DNN LID model had six hidden layers with 2048 nodes at each layer. A context window with 41 frames was selected for the DNN model. The bi-directional LSTM LID model had six hidden layers with 512 LSTM units in each direction at each layer. Based on the model type and whether CS data was used for training, there were a total of 6 LID models: two types for each of the following scenarios: only monolingual data (ZH+EN), merged monolingual and CS data (ZH+EN+CS), and only CS data (CS).

The performance of the six LID models was evaluated. The frame level accuracies on the CS test set are given in Table 2. Note that the overall accuracy was evaluated for all the switches (between ZH, EN, and silence) while the switching accuracy was only evaluated at frames where a switch between ZH and EN happens. The results in Table 2 show that with CS training data, both DNN and LSTM based LIDs perform better than those trained without CS data. It can also be observed that for scenarios without CS training data, DNN based LIDs perform better than LSTM based ones. Without seeing any CS data during training, the LSTM model cannot easily switch for CS utterances because its memory learning doesn't see many such patterns. In contrast, the frame-by-frame processing of the DNN model makes it easier to switch between languages. For scenarios with CS training data, LSTM based LIDs outperform DNN based ones in general. This is because the powerful LSTM model had previously observed CS patterns during training.

In particular, Table 2 provides frame-level accuracy (%) of various LIDs on the CS test set. Overall accuracy is evaluated for all switches (between ZH, EN, and silence) while the switching accuracy is only evaluated at frames where a switch between ZH and EN occurs.

TABLE 2

| ID | Model | Training data | Overall acc. | Switching acc. |
|---|---|---|---|---|
| LID1 | DNN | ZH + EN | 68.9 | 40.1 |
| LID2 | LSTM | ZH + EN | 64.6 | 37.5 |
| LID3 | DNN | ZH + EN + CS | 76.7 | 67.0 |
| LID4 | LSTM | ZH + EN + CS | 86.2 | 68.5 |
| LID5 | DNN | CS | 88.5 | 78.7 |
| LID6 | LSTM | CS | 94.4 | 84.0 |

Table 3 illustrates WERs (%) of a CTC model adjusted by LDs with $\alpha=1$. Both CTC and LID models were trained with monolingual data only without observing CS data.

TABLE 3

| | | ZH + EN | |
|---|---|---|---|
| Test set | no LID | +LID1 | +LID2 |
| CS set | 59.08 | 55.38 | 58.11 |
| ZH set | 11.04 | 11.26 | 11.11 |

The performance of adjusting the baseline CTC model were then evaluated via different LIDs. Table 3 shows the WERs of the CTC model adjusted by two LIDs on the CS and Chinese test sets. Both CTC and LIDs were trained with monolingual ZH and EN data. "LID1" is a DNN model and "LID2" is a LSTM model. $\alpha$ in Equation 3 is set to a default value of 1.

When combining with the LID1 model, the WER on the CS test set was reduced from 59.08% to 55.38%, which stands for 6.3% relative WER reduction, while the degradation on the Chinese test was within 2% relative. Combining with the LID2 model, there was almost no degradation on the Chinese test with 1.6% relative WER reduction on the CS test set. The improvement on the CS test set without seeing any CS data during training shows the effectiveness of this approach.

Table 4 shows the WERs of a CTC model (trained with both monolingual and CS data) adjusted by four LTDs on the CS and Chinese test sets with $\alpha=1$. "LID3" and "LID4" are DNN and LSTM based LTDs trained with monolingual plus CS data. "LID5" and "LID6" are DNN and LSTM based LTDs trained with only CS data. Combining with the LID3 model reduced the WER on the CS test set from 30.81% to 29.52%, which stands for 4.2% relative WER reduction, but degraded the Chinese test set with 3.7% relative. Combining with the LID4 model controlled the loss on the Chinese set to within 1%, with also around 1% relative improvement on the CS test set. Given the LID6 model was trained with only CS data, it has the best LID accuracy on the CS test set, resulting in the best combination WER as 28.06%. However, this also brought the WER on the Chinese set up to 12.23%. As a result, improving the performance on the CS test sets without considering the effect on major language performance is not desirable.

Table 4 illustrates WERs (%) of a CTC model (trained with CS data) adjusted by LIDs with $\alpha=1$.

TABLE 4

| | | with CS | | only CS | |
|---|---|---|---|---|---|
| Test set | no LID | +LID3 | +LID4 | +LID5 | +LID6 |
| CS set | 30.81 | 29.52 | 30.53 | 30.08 | 28.06 |
| ZH set | 11.01 | 11.42 | 11.14 | 13.90 | 12.23 |

Thus, some embodiments provide a LID based approach for CS ASR in E2E CTC models. The performance may be improved by switching from the challenging problem of recognizing a large amount of ASR units from both languages to an easier task of recognizing languages. Some embodiments may separately train a E2E CTC model and a LID and directly adjust the posteriors of the E2E CTC model with the posteriors of the LID. Other embodiments may further improve the LID with weighted decisions among frames, a joint training approach, and/or other E2E models.

While some implementations will be described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
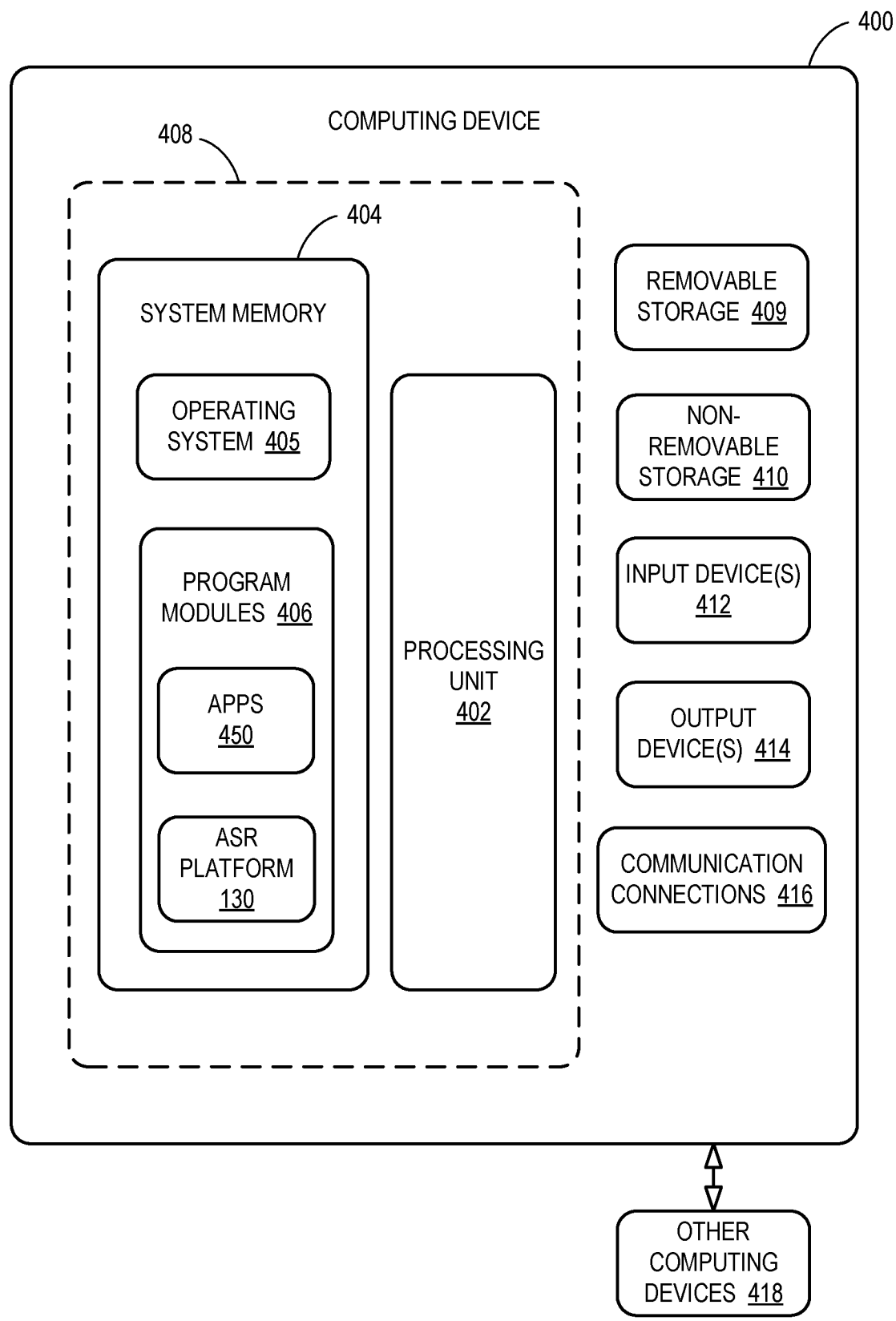
FIG. 4 is a block diagram illustrating example physical components of a computing device in accordance with some embodiments.
Figure 5A:
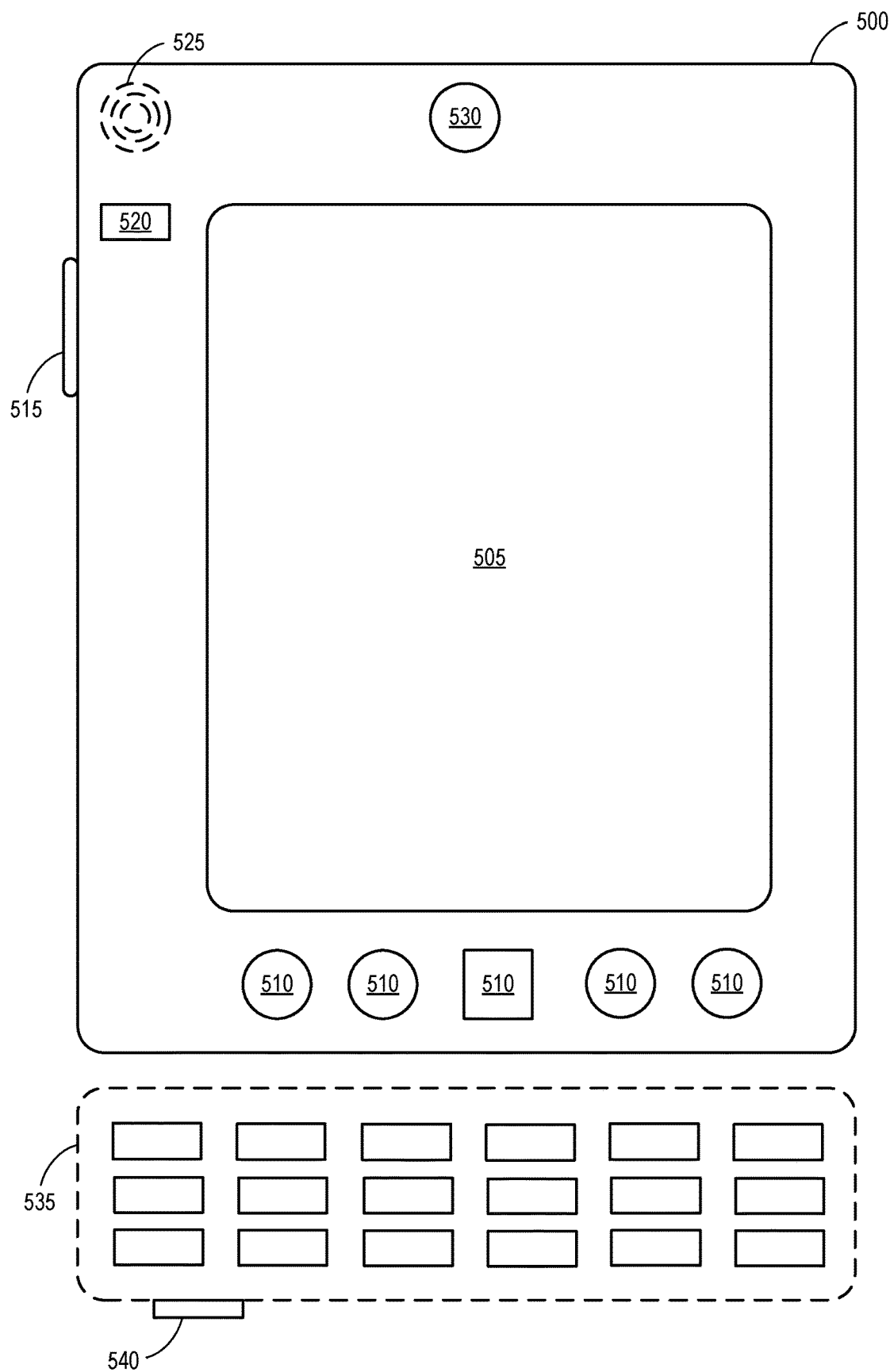
FIGS. 5A and 5B are block diagrams of a mobile computing device according to some embodiments.
Figure 5B:
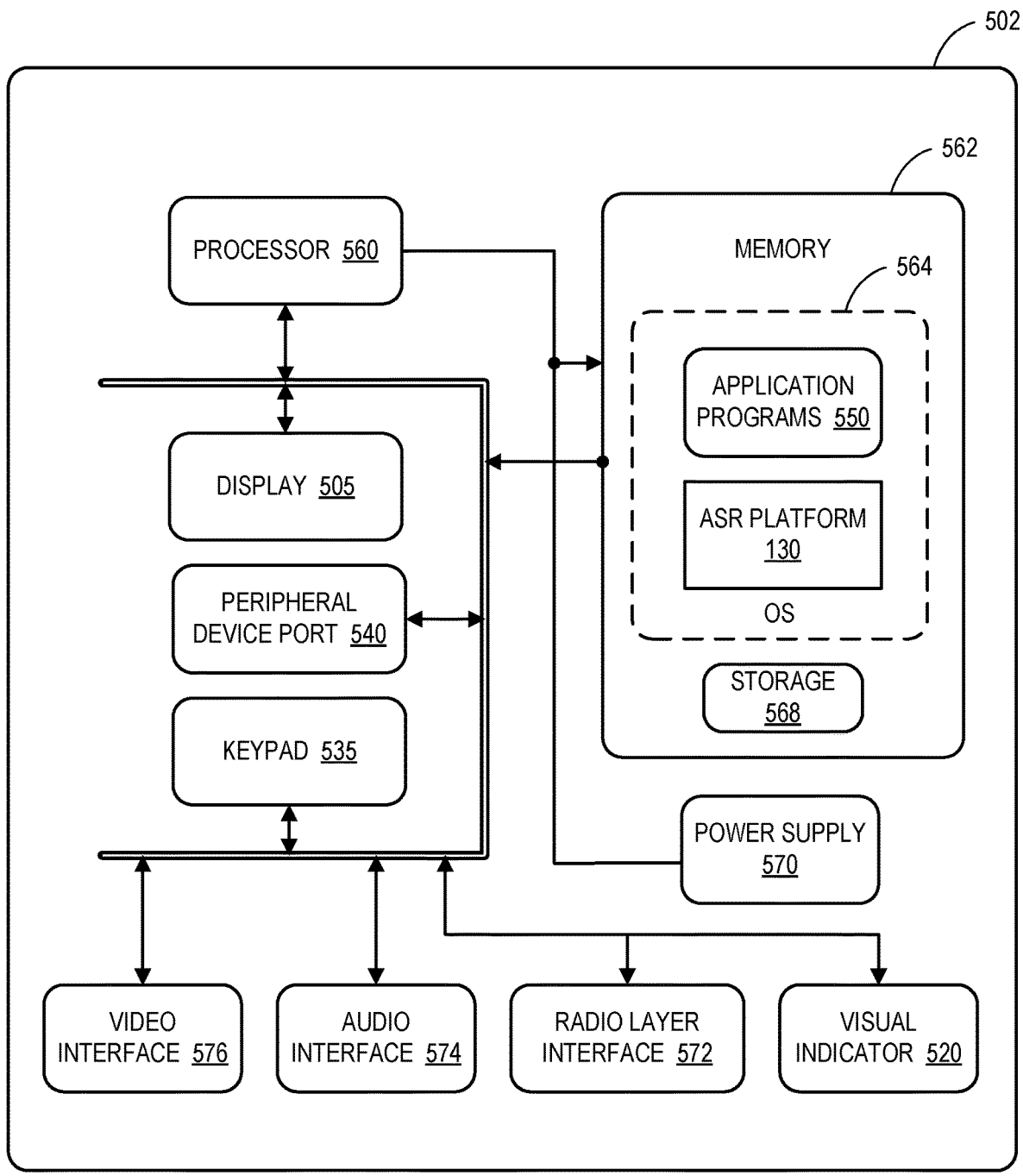
Figure 6:
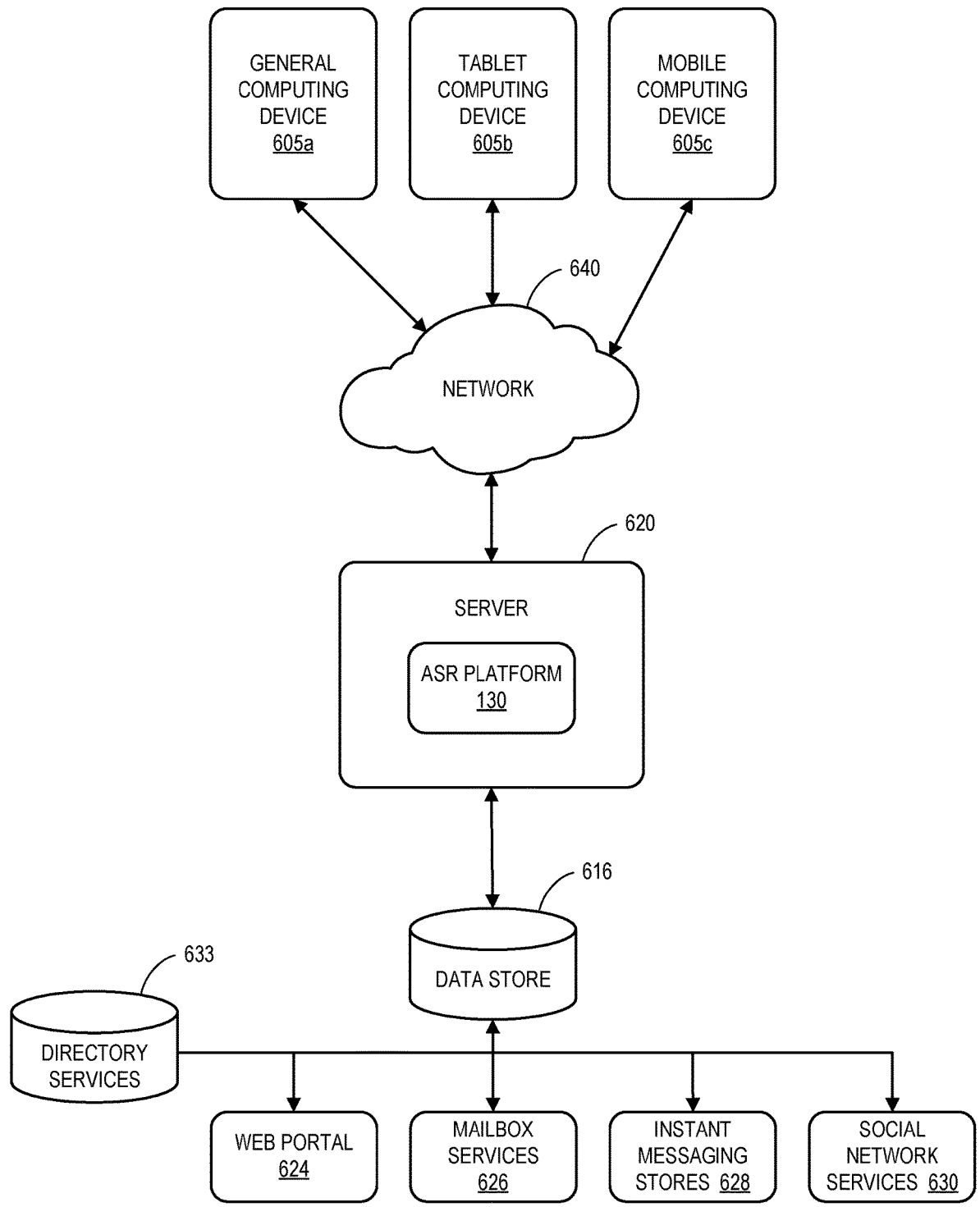
FIG. 6 is a block diagram of a distributed computing system in accordance with some embodiments.

FIGS. 4 through 6 and the associated descriptions provide a discussion of a variety of operating environments in which examples are practiced. However, the devices and systems illustrated and discussed with respect to FIGS. 4 through 6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the ASR platform 130 in accordance with any of the embodiments described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., ASR platform 130 in accordance with any of the embodiments described herein) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, Radio Frequency ("RF") transmitter, receiver, and/or transceiver circuitry; Universal Serial Bus ("USB"), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, Electrically Erasable Programmable Read-Only Memory ("EEPROM"), flash memory or other memory technology, CD-ROM, Digital Versatile Disks ("DVD") or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, RF, infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535.

According to an aspect, the optional keypad 535 is a physical keypad. According to another aspect, the optional keypad 535 is a "soft" keypad generated on the touch screen display. In various aspects, the output elements include the display 505 for showing a Graphical User Interface ("GUI"), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated Personal Digital Assistant ("PDA") and wireless phone.

According to an aspect, one or more application programs 550 are loaded into the memory 562 and run on or in association with the operating system 564. Examples of the application programs include phone dialer programs, e-mail programs, Personal Information Management ("PIM") programs, word processing programs, spreadsheet programs, Internet browser programs, messaging programs, and so forth. According to an aspect, ASR platform 130 in accordance with any of the embodiments described herein and/or one or more speech recognition models may be loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a Light Emitting Diode ("LED") and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic speech recognition as described above. Content developed, interacted with, or edited in association with the ASR platform 130 in accordance with any of the embodiments described herein is enabled to be stored in different communication channels or other storage types. For example, various documents may be stored using a directory service 622, a web portal 624, a mailbox service 626, an instant messaging store 628, or a social networking site 630. The ASR platform 130 in accordance with any of the embodiments described herein is operative to use any of these types of systems or the like for developing E2E CTC for CS ASR. According to an aspect, a server 620 provides the ASR platform 130 in accordance with any of the embodiments described herein to clients 605a, 605b, 605c. As one example, the server 620 is a web server providing the ASR platform 130 in accordance with any of the embodiments described herein over the web. The server 620 provides the ASR platform 130 in accordance with any of the embodiments described herein over the web to clients 605 through a network 640. By way of example, the client computing device is implemented and embodied in a personal computer 605a, a tablet computing device 605b, or a mobile computing device 605c (e.g., a smart phone), or other computing device. Any of these examples of the client computing device are operable to obtain content from the store 616.

Figure 7:
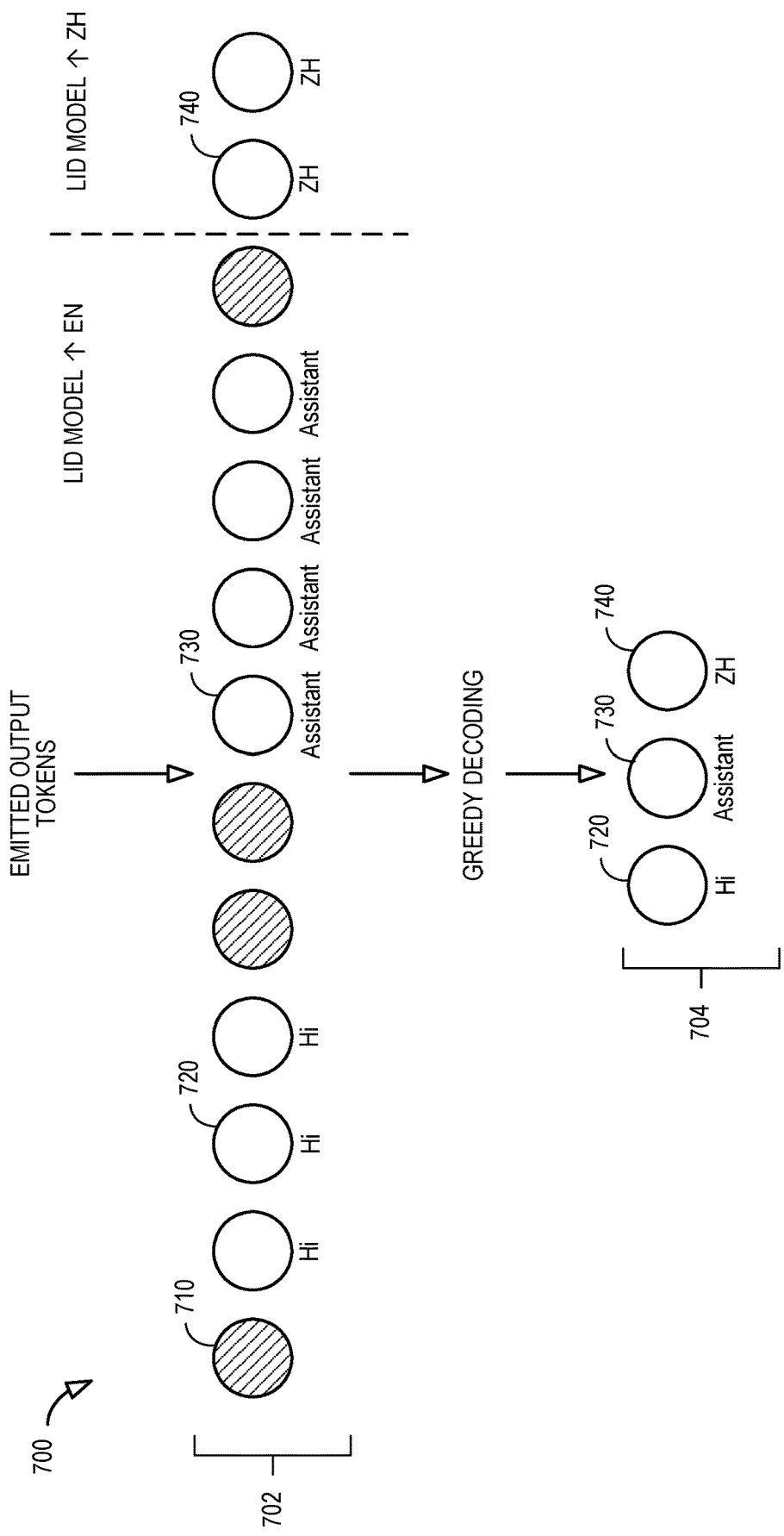
FIG. 7 illustrates the collapse of output tokens using greedy decoding according to some embodiments.

According to some embodiments, the ASR platform 130 may collapse emitted output tokens using greedy decoding to generate an automatic speech recognition decoding hypothesis (e.g., representing a series of CS words spoken in an utterance). FIG. 7 illustrates 700 the collapse of emitted output tokens 702 using greedy decoding according to some embodiments. In particular, the emitted output tokens 702 include silence output tokens 710 (represented by cross-hatching in FIG. 7), an EN output token 720 representing the word "hi," an output token 730 representing the word "assistant," and a ZH token 740 (e.g., representing a Chinese word or character). A LID model may have identified the "hi" and "assistant" output tokens 720, 730 as having a high probability of being spoken in English. Similarly, the LID model may have identified the ZH output tokens 740 as having a high probability of being spoken in Chinese. Note that output tokens are emitted on a frame-by-frame basis, and a single word will generally be represented by multiple frames. As a result, multiple repeated output tokens exist (e.g., four consecutive "assistant" output tokens 730). After the greedy decoding process removes the silence output tokens 710 and repetitive output tokens, the collapsed set of output tokens 704 represent "Hi"—"Assistant"—ZH word.

Figure 8:
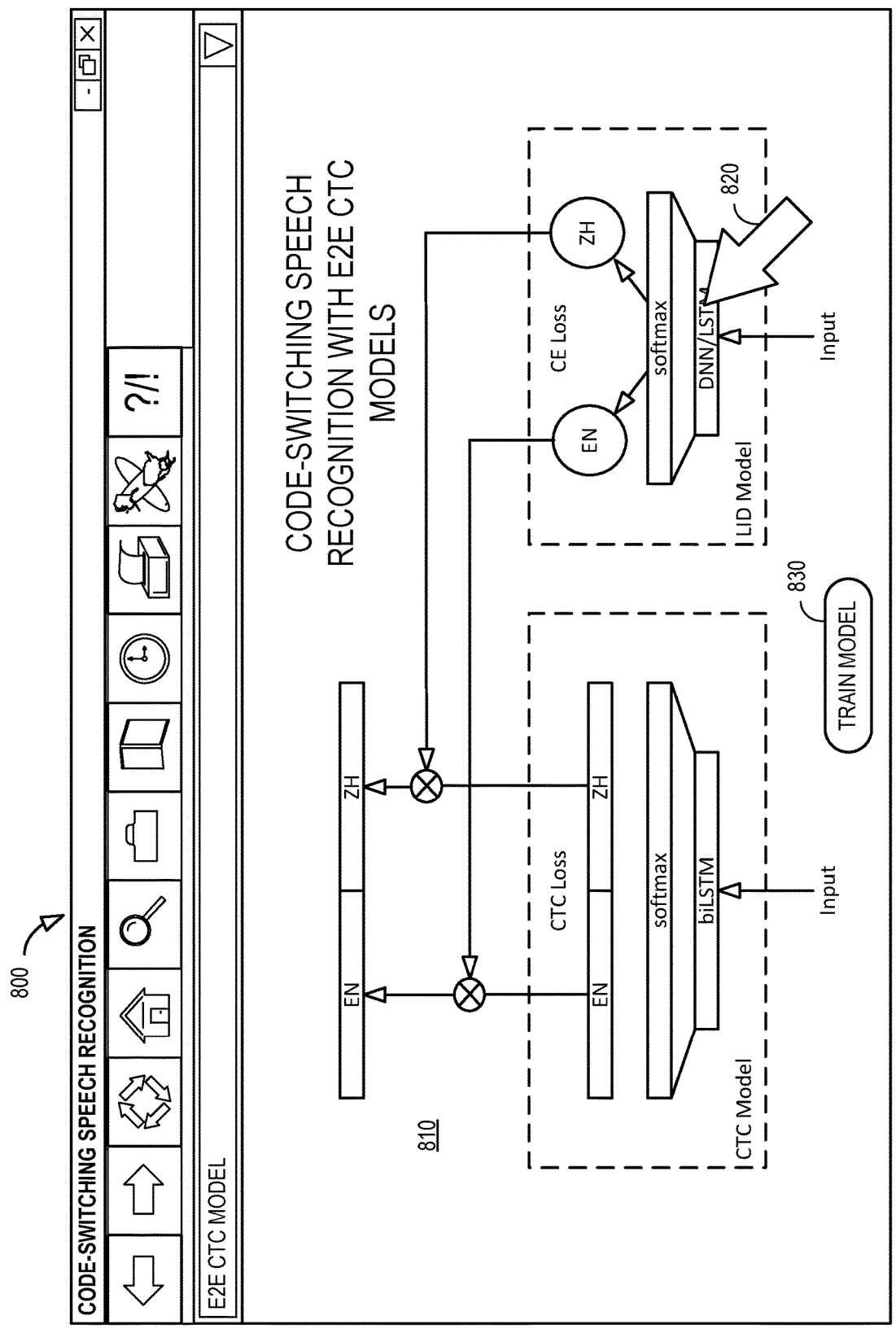
FIG. 8 is an operator or administrator display in accordance with some embodiments.

An operator or administrator may view and/or adjust parameters associated with an E2E CTC model that performs CS ASR in accordance with any of the embodiments described herein. For example, FIG. 8 is CS speech recognition with E2E CTC models display 800 in accordance with some embodiments. The display 800 includes graphical elements 810 representing an explicitly combined CTC model and a frame-level LID model for recognizing CS utterances. Selection of various elements 810 (e.g., via a touchscreen or computer mouse pointer 820) may result in a display of additional details about that element 810 (e.g., via pop-up window) and/or provide the operator or administrator with a chance to alter or adjust properties of that element 810. For example, the operator or administrator might adjust CTC or LID model parameters, update training sets, adjust LSTM or DNN configurations, etc. According to some embodiments, selection of a "Train Model" icon might result in updating various CS ASR models with ZH+EN data, ZH+EN+CS data, etc.

Some implementations are described herein with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Thus, embodiments may provide systems and methods to accurately and efficiently improve CS ASR via an E2E CTC model. The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A system for automatic speech recognition associated with a major language and a secondary language, comprising:
    a computer processor; and
    a memory storage device including instructions that when executed by the computer processor enable the system to:
        during a decoding process for each of a series of frames associated with a speech waveform input, if silence dominates a current frame then emit a silence output token; and
        if silence does not dominate the current frame, then:
            multiply a major language output token posterior vector constructed from posteriors of major language tokens from a Code-Switching ("CS") Connectionist Temporal Classification ("CTC") model with a Language Identification ("LID") model major language probability to create a probability vector from the major language,
            wherein the CS CTC model was: (1) initialized from the major language CTC model by keeping network hidden weights and replacing output tokens of the major language CTC model with a union of major language output tokens, secondary language output tokens, and the silence output token and (2) the initialized CTC model was trained by updating parameters with training data from both the major language and the secondary language, and
            further wherein the LID model was trained with the training data in connection with three-frame-by-frame outputs: (1) the major language probability, (2) a secondary language probability, and (3) a silence probability,
            multiply a secondary language output token posterior vector from the CS CTC model with the LID secondary language probability to create a probability vector from the secondary language, and emit the output token associated with the highest probability across all tokens from the major and secondary language.

2. The system of claim 1, further comprising instructions that when executed by the computer processor enable the system to:
collapse the emitted output tokens using greedy decoding to generate an automatic speech recognition decoding hypothesis.

3. The system of claim 2, wherein the greedy decoding removes silence output tokens and repetitive language output tokens.

4. The system of claim 1, wherein the CTC model comprises bidirectional Long Short-Term Memory ("LSTM") Recurrent Neural Networks ("RNNs").

5. The system of claim 4, wherein an objective function for the CTC model is CTC loss.

6. The system of claim 1, wherein the LID model is associated with feed-forward Deep Neural Networks ("DNNs") and Long Short-Term Memories ("LSTMs") to build a frame-level LID model.

7. The system of claim 6, wherein the LID model utilizes information from a context window that includes data external to the current frame.

8. A computer-implemented method for automatic speech recognition associated with a first language and a second language, comprising:
during a decoding process for each of a series of frames associated with a speech waveform input, if silence dominates a current frame, emitting a silence output token; and
if silence does not dominate the current frame:
multiplying a first language output token posterior vector constructed from posteriors of major language tokens from a Code-Switching ("CS") Connectionist Temporal Classification ("CTC") model with a Language Identification ("LID") model first language probability to create a probability vector from the first language,
wherein the CS CTC model was: (1) initialized from the major language CTC model by keeping network hidden weights and replacing output tokens of the major language CTC model with a union of major language output tokens, secondary language output tokens, and the silence output token and (2) the initialized CTC model was trained by updating parameters with training data from both the major language and the secondary language, and
further wherein the LID model was trained with the training data in connection with three frame-by-frame outputs: (1) the major language probability, (2) a secondary language probability, and (3) a silence probability,
multiplying a second language output token posterior vector from the CS CTC model with the LID second language probability to create a probability vector from the second language, and
emitting the output token associated with the highest probability across all tokens from the major and secondary language.

9. The method of claim 8, further comprising:
collapsing the emitted output tokens using greedy decoding to generate an automatic speech recognition decoding hypothesis.

10. The method of claim 9, wherein the greedy decoding removes silence output tokens and repetitive language output tokens.

11. The method of claim 8, wherein the CTC model comprises bidirectional Long Short-Term Memory ("LSTM") Recurrent Neural Networks ("RNNs").

12. The method of claim 11, wherein an objective function for the CTC model is CTC loss.

13. The method of claim 8, wherein the LID model is associated with feed-forward Deep Neural Networks ("DNNs") and Long Short-Term Memories ("LSTMs") to build a frame-level LID model.

14. The method of claim 13, wherein the LID model utilizes information from a context window that includes data external to the current frame.

15. A non-transient, computer-readable medium storing instructions to be executed by a processor to perform a method for automatic speech recognition associated with a major language and a secondary language, the method comprising:
during a decoding process for each of a series of frames associated with a speech waveform input, if silence dominates a current frame, emitting a silence output token;
if silence does not dominate the current frame:
multiplying a first language output token posterior vector constructed from posteriors of major language tokens from a Code-Switching ("CS") Connectionist Temporal Classification ("CTC") model with a Language Identification ("LID") model first language probability to create a probability vector from the first language,
wherein the CS CTC model was: (1) initialized from the major language CTC model by keeping network hidden weights and replacing output tokens of the major language CTC model with a union of major language output tokens, secondary language output tokens, and the silence output token and (2) the initialized CTC model was trained by updating parameters with training data from both the major language and the secondary language, and
further wherein the LID model was trained with the training data in connection with three frame-by-frame outputs: (1) the major language probability, (2) a secondary language probability, and (3) a silence probability,
multiplying a second language output token posterior vector from the CS CTC model with the LID second language probability to create a probability vector from the second language, and
emitting the output token associated with the highest probability across all tokens from the first and second language; and
collapsing the emitted output tokens using greedy decoding to generate an automatic speech recognition decoding hypothesis.

16. The medium of claim 15, wherein the greedy decoding removes silence output tokens and repetitive language output tokens.

17. The medium of claim 15, wherein the CTC model comprises bidirectional Long Short-Term Memory ("LSTM") Recurrent Neural Networks ("RNNs").

18. The medium of claim 17, wherein an objective function for the CTC model is CTC loss.

19. The medium of claim 15, wherein the LID model is associated with feed-forward Deep Neural Networks ("DNNs") and Long Short-Term Memories ("LSTMs") to build a frame-level LID model.

20. The medium of claim 19, wherein the LID model utilizes information from a context window that includes data external to the current frame.

* * * * *